United States Patent
Jung et al.

(10) Patent No.: US 10,440,363 B2
(45) Date of Patent: Oct. 8, 2019

(54) ENCODER PERFORMING QUANTIZATION BASED ON DEADZONE, AND VIDEO PROCESSING SYSTEM COMPRISING THE SAME

(71) Applicant: Samsung Electronics Co., Ltd., Suwon-si, Gyeonggi-do (KR)

(72) Inventors: Young-beom Jung, Seoul (KR); Hyuk-jae Jang, Suwon-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 68 days.

(21) Appl. No.: 15/667,924

(22) Filed: Aug. 3, 2017

(65) Prior Publication Data
US 2018/0176568 A1    Jun. 21, 2018

(30) Foreign Application Priority Data

Dec. 16, 2016  (KR) .................. 10-2016-0172903

(51) Int. Cl.
*H04N 19/00* (2014.01)
*H04N 19/126* (2014.01)
(Continued)

(52) U.S. Cl.
CPC ......... *H04N 19/126* (2014.11); *H04N 19/136* (2014.11); *H04N 19/146* (2014.11);
(Continued)

(58) Field of Classification Search
CPC ....... H04N 11/04; H04N 19/126; H04N 19/61
See application file for complete search history.

(56) References Cited

U.S. PATENT DOCUMENTS 7,620,103 B2 * 11/2009 Cote .................. H04B 1/66
                                                        375/240.03
7,974,340 B2 *  7/2011 Xia ................... H04N 19/126
                                                        375/240.03
(Continued)

FOREIGN PATENT DOCUMENTS

JP    2006279272 A    10/2006
JP    2008177916 A     7/2008
KR     101359500 B1    2/2014

OTHER PUBLICATIONS

Jiang et al. A Perceptual Based Dead-Zone Adjustment Algorithm FORH.264, Proceedings of 2CXJ4Internationai Symposium on Intelligent Multimedia, Video and Speech Processing Oct. 20-22, 2004 Hong Kong.*

(Continued)

*Primary Examiner* — Frank F Huang
(74) *Attorney, Agent, or Firm* — Harness, Dickey & Pierce, P.L.C.

(57) ABSTRACT

An encoder that performs quantization based on a deadzone and a video processing system including the encoder are provided. The encoder includes: a domain transform unit configured to transform first image data of a spatial domain into second image data of a frequency domain including first to N-th pieces of frequency data (wherein N is an integer equal to or greater than 1); a deadzone determination unit including a human visual system (HVS) table including human visual frequency sensitivities and configured to determine, based on the HVS table, a deadzone regarding each of the first to N-th pieces of frequency data; and a quantization unit configured to perform, based on the deadzone, quantization regarding the second image data.

17 Claims, 18 Drawing Sheets

(51) Int. Cl.

| | |
|---|---|
| *H04N 19/146* | (2014.01) |
| *H04N 19/172* | (2014.01) |
| *H04N 19/174* | (2014.01) |
| *H04N 19/176* | (2014.01) |
| *H04N 19/18* | (2014.01) |
| *H04N 19/136* | (2014.01) |
| *H04N 19/105* | (2014.01) |

(52) U.S. Cl.
CPC ......... *H04N 19/172* (2014.11); *H04N 19/174* (2014.11); *H04N 19/176* (2014.11); *H04N 19/18* (2014.11); *H04N 19/105* (2014.11)

(56) References Cited

U.S. PATENT DOCUMENTS

| | | | |
|---|---|---|---|
| 8,437,053 B2 * | 5/2013 | Edge | H04N 1/6058 358/520 |
| 8,542,731 B2 * | 9/2013 | Tourapis | H04N 19/159 375/240.04 |
| 8,743,956 B2 | 6/2014 | Chono et al. | |
| 8,923,390 B2 | 12/2014 | Au et al. | |
| 2009/0262801 A1 | 10/2009 | Chen et al. | |
| 2016/0134872 A1 * | 5/2016 | Su | H04N 19/176 375/240.03 |

OTHER PUBLICATIONS

C. Wang et al."Designing JPEG Quantization Tables Based on Human Visual System" Signal Processing Image Communication 16 (2001) 501-506.

\* cited by examiner

FIG. 13

| D_Dz1 | | D_Dz3 | |
|---|---|---|---|
| 0 | 1 | 1 | 0 |
| 1 | 1 | 0 | 0 |
| 1 | 0 | 1 | 0 |
| 0 | 0 | 0 | 1 |

[D_Dz]

| D_Frq1 | | D_Frq3 | |
|---|---|---|---|
| 90 | 110 | 110 | 120 |
| 110 | 130 | 90 | 150 |
| 110 | 90 | 190 | 200 |
| 120 | 150 | 200 | 500 |

[D_Frq]

⇒

| D_Frq'1 | | D_Frq'3 | |
|---|---|---|---|
| 0 | 110 | 110 | 0 |
| 110 | 13 | 0 | 0 |
| 110 | 0 | 190 | 0 |
| 0 | 0 | 0 | 500 |

[D_Frq']

ENCODER PERFORMING QUANTIZATION BASED ON DEADZONE, AND VIDEO PROCESSING SYSTEM COMPRISING THE SAME

CROSS-REFERENCE TO RELATED APPLICATION

This application claims the benefit of Korean Patent Application No. 10-2016-0172903, filed on Dec. 16, 2016, in the Korean Intellectual Property Office, the disclosure of which is incorporated herein in its entirety by reference.

BACKGROUND

Example embodiments of the inventive concepts relate to an encoder and/or a video processing system including the encoder. For example, at least some example embodiments of the inventive concepts relate to an encoder that performs quantization on image data based on a deadzone, and/or a video processing system including the same.

Along with the development and spread of hardware capable of reproducing and storing high-resolution or high-definition video content, encoders may be used to effectively encode high-resolution or high-definition video content. Encoders may perform encoding using quantization on image data. However, such encoders may use a huge amount of data, and further may lack consideration of human visual properties.

SUMMARY

Example embodiments of the inventive concepts provide an encoder that sets a deadzone based on human visual sensitivity, and/or a video processing system including the encoder.

According to an example embodiment of the inventive concepts, there is provided an encoder.

In some example embodiments, the encoder may a domain transform unit configured to transform first image data of a spatial domain into second image data of a frequency domain, the second image data including first to N-th pieces of frequency data, N being an integer equal to or greater than 1; a deadzone determination unit configured to determine a deadzone regarding each of the first to N-th pieces of frequency data based on a human visual system (HVS) table, the HVS table storing human visual frequency sensitivities; and a quantization unit configured to perform, based on the deadzone, quantization regarding the second image data.

According to another aspect of the inventive concept, there is provided a video processing system.

In some example embodiments, the video processing system may include a memory configured to store a human visual system (HVS) table including human visual frequency sensitivities; and an encoder including, a domain transform unit configured to transform first image data of a spatial domain into second image data of a frequency domain, the second image data including first to N-th pieces of frequency data, N being an integer equal to or greater than 1, a deadzone determination unit configured to determine, based on the HVS table, a deadzone regarding each of the first to N-th pieces of frequency data, and a quantization unit configured to perform, based on the deadzone, quantization regarding the second image data.

According to another aspect of the inventive concept, there is provided an encoder.

In some example embodiments, the encoder includes processing circuitry configured to, determine a deadzone in each of a plurality of pieces of image data based on Human Visual System (HVS) information indicating human visual frequency sensitivities, the plurality of pieces of image data being in a frequency domain, and quantize the plurality of pieces of image data based on the deadzone.

BRIEF DESCRIPTION OF THE DRAWINGS

Example embodiments of the inventive concepts will be more clearly understood from the following detailed description taken in conjunction with the accompanying drawings in which:

FIG. 13 is a diagram of a deadzone frequency data processing method of a quantization unit, according to an example embodiment of the present disclosure;

DETAILED DESCRIPTION

Figure 1:
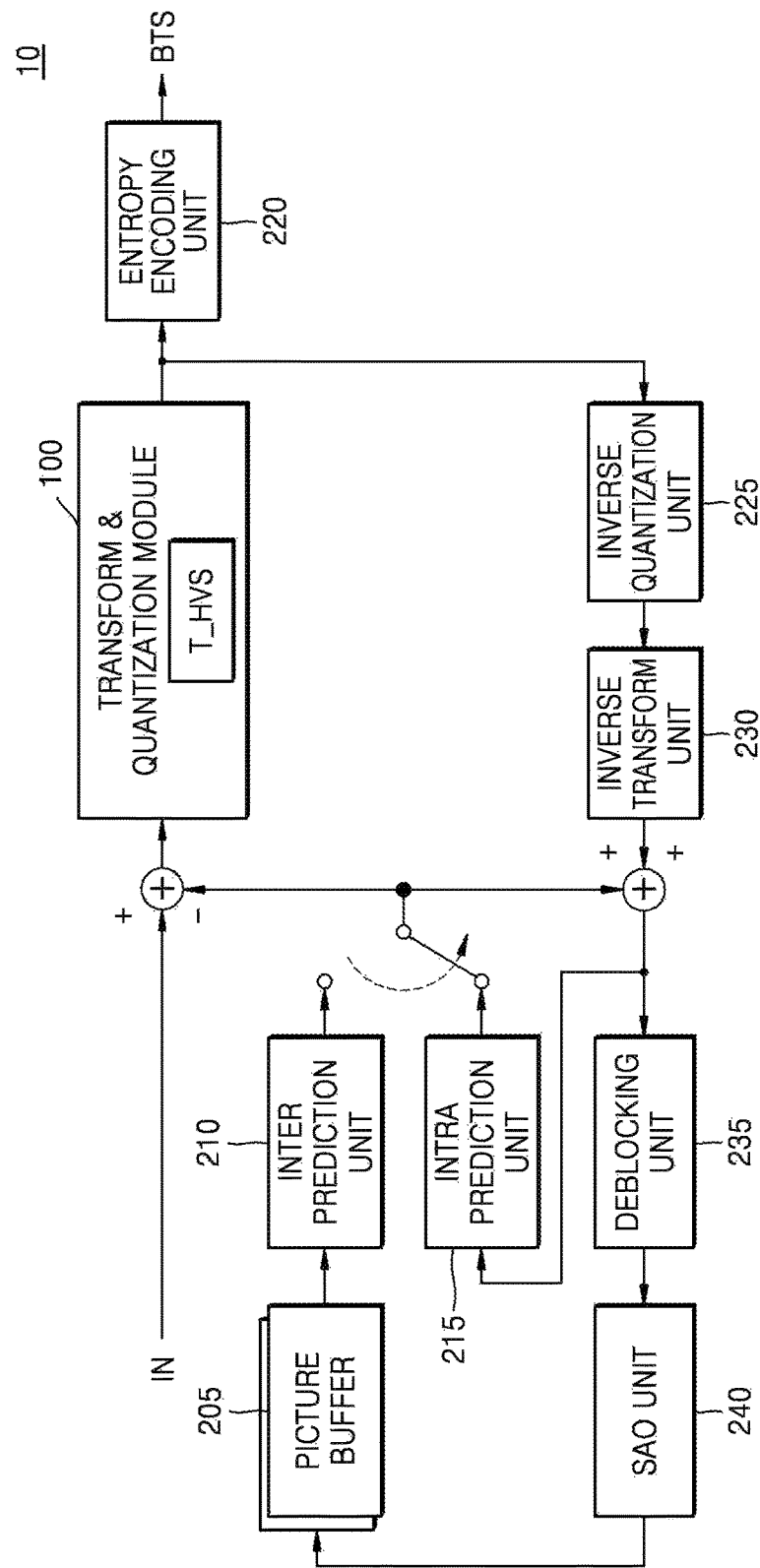
FIG. 1 is a block diagram of an encoder according to an example embodiment of the present disclosure.

FIG. 1 is a block diagram of an encoder 10 according to an example embodiment of the present disclosure.

Referring to FIG. 1, the encoder 10 may include a memory and processing circuitry.

The memory may include may include a non-transitory computer readable medium. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer-readable media may also be a distributed network, so that the program instructions are stored and executed in a distributed fashion.

The processing circuitry may include a processor, Central Processing Unit (CPU), a controller, an arithmetic logic unit (ALU), a digital signal processor, a microcomputer, a field programmable gate array (FPGA), an Application Specific Integrated Circuit (ASIC), a System-on-Chip (SoC), a programmable logic unit, a microprocessor, or any other device capable of performing operations in a defined manner.

The processing circuitry may be configured, through a layout design and/or execution of computer readable instructions stored in the memory, as a special purpose computer to perform the functions of the encoder 10 and the sub-components thereof.

For example, the encoder 10 may include a transform and quantization module 100, a picture buffer 205, an inter prediction unit 210, an intra prediction unit 215, an entropy encoding unit 220, an inverse quantization unit 225, an inverse transform unit 230, a deblocking unit 235, and a sample adaptive offset (SAO) unit 240. The processing circuitry may be configured, through a layout design and/or execution of computer readable instructions stored in the memory, as a special purpose computer to perform the functions of the transform and quantization module 100, the inter prediction unit 210, the intra prediction unit 215, the entropy encoding unit 220, the inverse quantization unit 225, the inverse transform unit 230, the deblocking unit 235, and/or the sample adaptive offset (SAO) unit 240. Further, the memory may be configured to perform the functions of the picture buffer 205.

The encoder 10 may perform a series of operations for encoding image data. The intra prediction unit 215 may perform, for each prediction unit, intra prediction with respect to an encoding unit of an intra mode from among a current image IN, and the inter prediction unit 210 may perform, for each prediction unit, inter prediction with respect to an encoding unit of an inter mode by using the current image IN and a reference image stored in the picture buffer 205. The current image IN may be split into maximum encoding units, and then, encoding may be sequentially performed thereon. In this regard, encoding may be performed with respect to an encoding unit having a maximum encoding unit allocated as a tree structure.

Residual data may be generated by using a difference between prediction data regarding an encoding unit of each mode outputted from the intra prediction unit 215 or the inter prediction unit 210 and data regarding an encoding unit of the current image IN. The residual data may be outputted for each transform unit as a quantization coefficient via the transform and quantization module 100.

According to an example embodiment of the present disclosure, the transform and quantization module 100 may include a human visual system (HVS) table T_HVS and may form a deadzone based on the HVS table T_HVS to perform quantization regarding the residual data. The HVS table T_HVS may include human visual sensitivity information for each frequency. According to the technical spirit of the present disclosure, since the human visual sensitivity information for each frequency may be used to determine the deadzone, an amount of information used in a frequency component that is not easily recognized by the human may decrease, and an amount of information used in a frequency component that is highly visually important may increase. Accordingly, subjective image quality may be increased by determining the deadzone in accordance with human vision.

The transform and quantization module 100 may perform quantization only with respect to the residual data not included in the deadzone, and for the residual data included in the deadzone, may determine the quantization coefficient as 0.

The quantization coefficient may be restored to residual data of a spatial domain via the inverse quantization unit 225 and the inverse transform unit 230. The restored residual data of the spatial domain may be added to the prediction data regarding an encoding unit of each mode outputted from the intra prediction unit 215 or the inter prediction unit 210, and thus may be restored to image data of the spatial domain regarding the encoding unit of the current image IN. The restored image data of the spatial domain may be generated as a restoration image via the deblocking unit 235 and the SAO unit 240. The generated restoration image may be stored in the picture buffer 205. Restoration images stored in the picture buffer 205 may be used as a reference image for inter prediction of another image. The quantization coefficient quantized in the transform and quantization module 100 may be outputted as a bitstream Bts via the entropy encoding unit 220.

Although data on which encoding is performed by the encoder 10 is described as image data throughout the present specification, this is just an example, and example embodiments may be applied to any type of data, such as video data or voice data, that encoding may be performed on.

Figure 2:
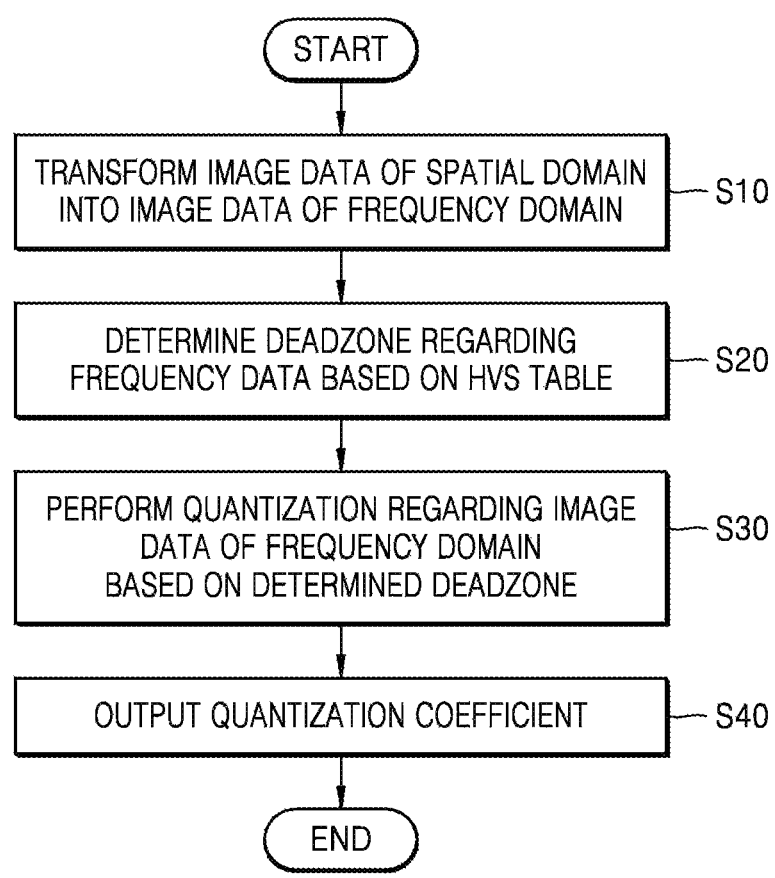
FIG. 2 is a flowchart of an operation method of a transform and quantization module, according to an example embodiment of the present disclosure.

FIG. 2 is a flowchart of an operation method of the transform and quantization module 100, according to an example embodiment of the present disclosure. Redundant descriptions relating to FIG. 1 will be omitted herein.

Referring to FIG. 2, in operation S10, the processing circuitry (e.g., the transform and quantization module 100) may transform image data of a spatial domain into image data of a frequency domain. According to an example embodiment of the present disclosure, the image data may be residual data. The image data of the frequency domain may include first to N-th pieces of frequency data divided for each frequency.

In operation S20, the processing circuitry (e.g., the transform and quantization module 100) may determine a deadzone regarding each of the first to N-th pieces of frequency data based on an HVS table. In the present specification, frequency data included in the deadzone from among the first to N-th pieces of frequency data may be referred to as deadzone frequency data, and frequency data not included in the deadzone may be referred to as normal frequency data.

In operation S30, the processing circuitry (e.g., the transform and quantization module 100) may determine a quantization coefficient of deadzone frequency data as 0 based on the determined deadzone, and may determine a quantization coefficient by performing quantization regarding normal frequency data.

In operation S40, the processing circuitry (e.g., the transform and quantization module 100) may output the determined quantization coefficient to the entropy encoding unit 220, etc.

Figure 3:
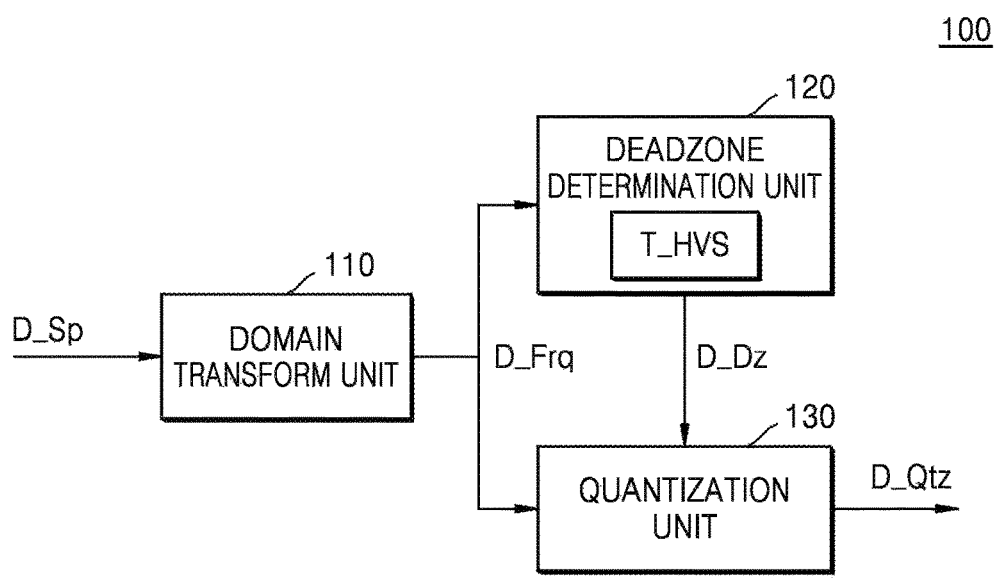
FIG. 3 is a block diagram of a transform and quantization module according to an example embodiment of the present disclosure.

FIG. 3 is a block diagram of the transform and quantization module 100 according to an example embodiment of the present disclosure.

Referring to FIG. 3, the processing circuitry, when performing the functions of the transform and quantization module 100, may be configured to perform the functions of a domain transform unit 110, a deadzone determination unit 120, and a quantization unit 130.

The domain transform unit 110 may receive image data D_Sp of a spatial domain and transform the image data D_Sp of the spatial domain into image data D_Frq of a frequency domain. In this regard, the image data D_Sp of the spatial domain may be image data regarding an image of a macro block unit. According to an example embodiment of the present disclosure, the domain transform unit 110 may generate the image data D_Frq of the frequency domain by performing a Fourier transform or discrete cosine transform regarding the image data D_Sp of the spatial domain. The image data D_Frq of the frequency domain may include first to N-th pieces of frequency data D_Frq1~N for each frequency. The domain transform unit 110 may output the generated image data D_Frq of the frequency domain to the deadzone determination unit 120 and the quantization unit 130.

The deadzone determination unit 120 may determine a deadzone regarding each of the first to N-th pieces of frequency data D_Frq1~N included in the received image data D_Frq of the frequency domain. For example, the deadzone determination unit 120 may include an HVS table T_HVS, and may determine a deadzone regarding each of the first to N-th pieces of frequency data D_Frq1~N based on the HVS table T_HVS. The HVS table T_HVS may include first to N-th visual frequency sensitivities HVS1~N indicating human visual sensitivity for each frequency. The first to N-th visual frequency sensitivities HVS1~N may be generated based on an empirical study. The deadzone determination unit 120 may determine a deadzone for each frequency by using the first to N-th visual frequency sensitivities HVS1~N. Also, the deadzone determination unit 120 may compare the first to N-th pieces of frequency data D_Frq1~N with the determined deadzone for each frequency and determine whether the first to N-th pieces of frequency data D_Frq1~N are included in a deadzone domain. The deadzone determination unit 120 may generate deadzone data D_Dz including information regarding whether the first to N-th pieces of frequency data D_Frq1~N are included in the deadzone domain and output the deadzone data D_Dz to the quantization unit 130. The deadzone determination unit 120 may further include a default deadzone in addition to the HVS table T_HVS. The default deadzone may be set based on an empirical study.

The deadzone determination unit 120 may determine a deadzone for each frequency by using the default deadzone and the HVS table T_HVS.

The quantization unit 130 may receive the first to N-th pieces of frequency data D_Frq1~N and the deadzone data D_Dz and check whether each of the first to N-th pieces of frequency data D_Frq1~N is included in the deadzone. The quantization unit 130 may determine a quantization coefficient as 0, with respect to deadzone frequency data which is included in the deadzone from among the first to N-th pieces of frequency data D_Frq1~N. Also, the quantization unit 130 may determine a quantization coefficient by performing quantization with respect to each piece of normal frequency data which is not included in the deadzone from among the first to N-th pieces of frequency data D_Frq1~N. The quantization unit 130 may output quantization coefficient data D_Qtz including determined quantization coefficients to an entropy encoding unit (for example, 220 of FIG. 1), etc.

Although FIG. 3 illustrates the deadzone determination unit 120 receiving the image data D_Frq of the frequency domain, generating the deadzone data D_Dz based on the image data D_Frq of the frequency domain, and outputting the deadzone data D_Dz to the quantization unit 130, in another example embodiment of the present disclosure, the deadzone determination unit 120 may not receive the image data D_Frq of the frequency domain and may output a deadzone table having information regarding a deadzone for each frequency, generated based on the HVS table T_HVS, to the quantization unit 130. The quantization unit 130 may make a distinction between deadzone frequency data and normal frequency data by using the received deadzone table and the image data D_Frq of the frequency domain.

Figure 4:
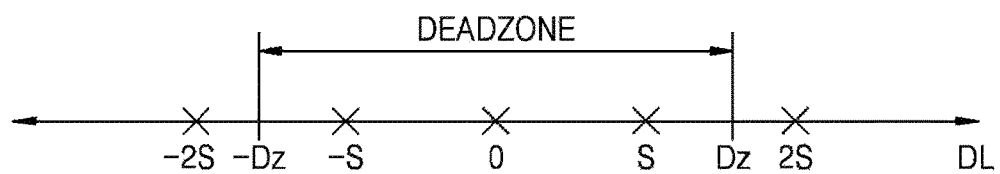
FIG. 4 is a one-dimensional graph of a deadzone according to an example embodiment of the present disclosure.

FIG. 4 is a one-dimensional graph of a deadzone according to an example embodiment of the present disclosure.

Referring to FIGS. 3 and 4, the horizontal axis of FIG. 4 may denote a data level DL of the frequency domain. For the data level DL of the frequency domain, a quantization step size S may be determined. The quantization step size S, which is a unit for performing quantization, may refer to a range of pieces of data having the same quantization coefficient. According to an example embodiment of the present disclosure, a deadzone Dz is determined by using an HVS table for each frequency and thus may be determined independently of the quantization step size S. In an example, the deadzone Dz may be greater than the quantization step size S. As the deadzone Dz based on human visual sensitivity is determined independently of the quantization step size S, quantization may be performed in accordance with human vision, and image quality may be improved according to human vision.

Figure 5:
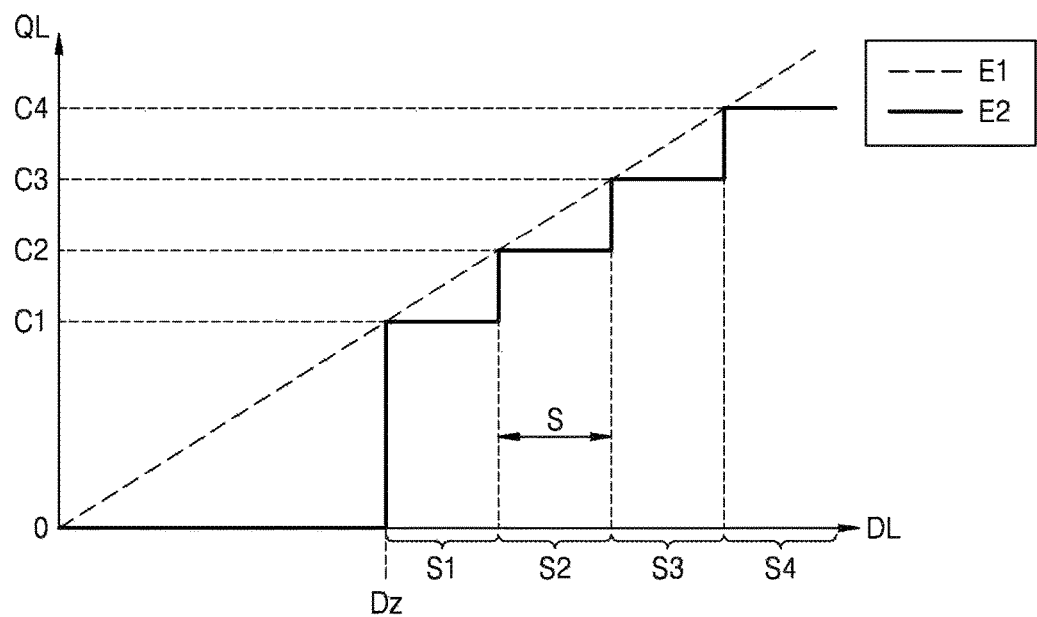
FIG. 5 is a two-dimensional graph of quantization according to an example embodiment of the present disclosure.

FIG. 5 is a two-dimensional graph of quantization according to an example embodiment of the present disclosure. A redundant description relating to FIG. 4 will be omitted herein.

Referring to FIGS. 3 and 5, when quantization regarding a piece of frequency data from among the image data D_Frq of the frequency domain is performed, a quantization coefficient may be determined according to the graph of FIG. 5. The horizontal axis of FIG. 5 may denote a data level DL, and the vertical axis of FIG. 5 may denote a quantization level QL. A dashed line E1 may be a plot of a linear function having one-to-one correspondence with a continuous data level, and a solid line E2 may be a plot of quantization according to example embodiments of the present disclosure. The continuous data level may be divided based on a step size S. For example, a data level after the deadzone Dz may sequentially include a first step unit S1, a second step unit S2, a third step unit S3, and a fourth step unit S4, based on the step size S.

When the quantization unit 130 performs quantization regarding a piece of frequency data from among the image data D_Frq of the frequency domain, the quantization unit 130 may determine the deadzone Dz by using the deadzone data D_Dz received from the deadzone determination unit

120. When frequency data is deadzone frequency data included in the deadzone Dz, the quantization unit 130 may determine a quantization coefficient corresponding to the frequency data as 0. As an example, the deadzone frequency data may refer to frequency data having a smaller data level than the deadzone Dz. For normal frequency data not included in the deadzone Dz, the quantization unit 130 may determine which step unit the normal frequency data belongs to and may quantize the normal frequency data by using a corresponding quantization coefficient. As an example, when a data level of normal frequency data belongs to the first step unit S1, the quantization unit 130 may quantize the normal frequency data by using a first quantization coefficient C1.

Although FIG. 5 illustrates an example in which quantization is performed by using a quantization coefficient corresponding to the dashed line E1 expressed as a linear function, example embodiments of the present disclosure is not limited thereto, and a quantization coefficient may be determined by another specific function other than a linear function.

Figure 6:
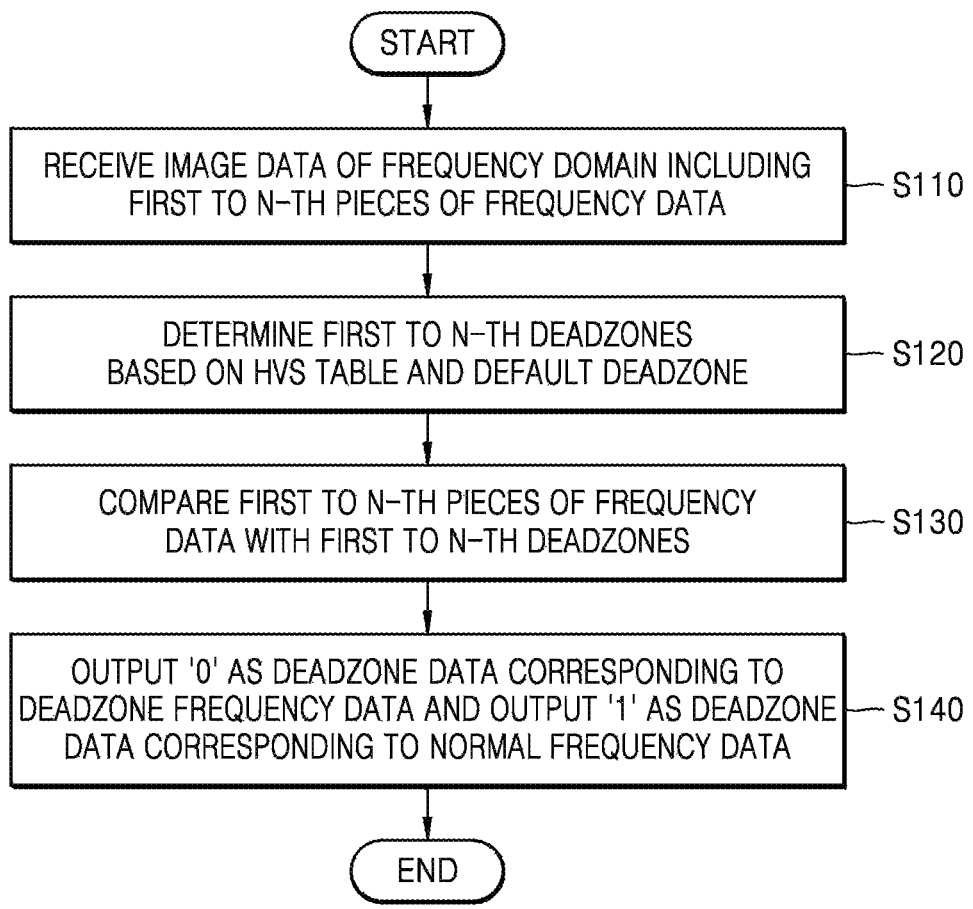
FIG. 6 is a flowchart of an operation of a deadzone determination unit, according to an example embodiment of the present disclosure.

FIG. 6 is a flowchart of an operation of the deadzone determination unit 120, according to an example embodiment of the present disclosure. A redundant description relating to FIG. 3 will be omitted herein.

Referring to FIGS. 3 and 6, in operation S110, the processing circuitry (e.g., the deadzone determination unit 120) may receive image data of a frequency domain including first to N-th pieces of frequency data D_Frq1~N from the domain transform unit 110.

In operation S120, the processing circuitry (e.g., the deadzone determination unit 120) may determine first to N-th deadzones Dz1~N for each frequency, based on the HVS table T_HVS and the default deadzone.

In operation S130, the processing circuitry (e.g., the deadzone determination unit 120) may compare the first to N-th pieces of frequency data D_Frq1~N with the determined first to N-th deadzones Dz1~N, respectively.

In operation S140, as a result of the comparison, the processing circuitry (e.g., the deadzone determination unit 120) may output '0' as the deadzone data D_Dz that corresponds to deadzone frequency data included in a deadzone domain from among the first to N-th pieces of frequency data D_Frq1~N and may output '1' as the deadzone data D_Dz that corresponds to normal frequency data not included in the deadzone domain. However, example embodiments are not limited thereto.

Figure 7:
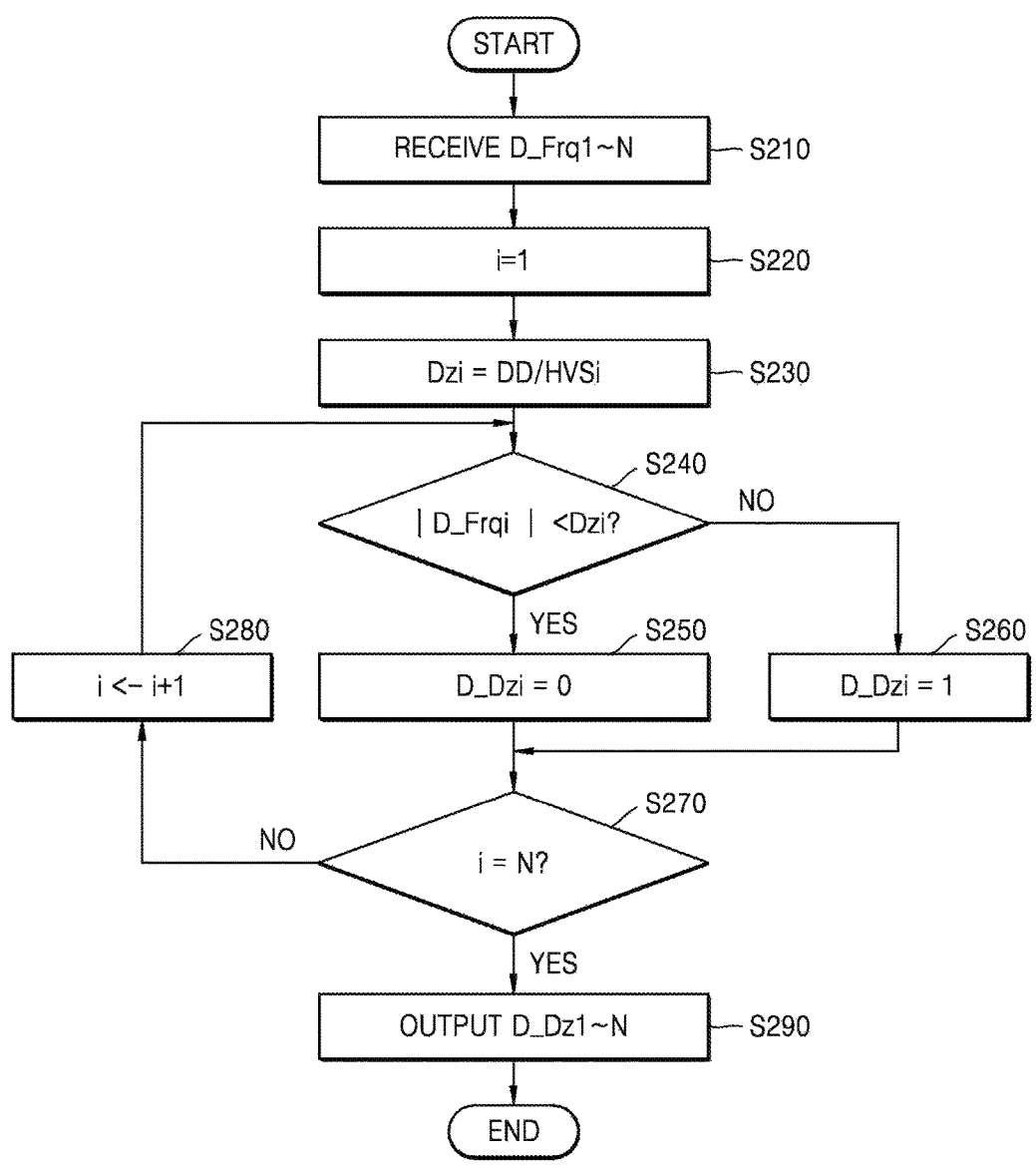
FIG. 7 is a flowchart of an operation algorithm of a deadzone determination unit, according to an example embodiment of the present disclosure.

FIG. 7 is a flowchart of an operation algorithm of the deadzone determination unit 120, according to an example embodiment of the present disclosure. In detail, FIG. 7 illustrates an algorithm of a process of determining a deadzone and deadzone data via the deadzone determination unit 120.

Referring to FIGS. 3 and 7, when, in operation S210, the processing circuitry (e.g., the deadzone determination unit 120) receives image data of a frequency domain including first to N-th pieces of frequency data D_Frq1~N.

In operation S220, the processing circuitry (e.g., the deadzone determination unit 120) may set an index i as '1'.

In operation S230, the processing circuitry (e.g., the deadzone determination unit 120) may determine an i-th deadzone Dzi as a value obtained by dividing a default deadzone DD by an i-th visual frequency sensitivity HVSi.

In operation S240, the processing circuitry (e.g., the deadzone determination unit 120) may check whether an absolute value of received i-th frequency data D_Frqi has a smaller data level than the i-th deadzone Dzi.

In operation S250, when the absolute value of the i-th frequency data D_Frqi has a smaller data level than the i-th deadzone Dzi, the i-th frequency data D_Frqi is deadzone frequency data which is in a deadzone domain, and accordingly, the processing circuitry (e.g., the deadzone determination unit 120) may determine the i-th deadzone data D_Dzi as '0'.

In contrast, in operation S260, when the absolute value of the i-th frequency data D_Frqi is greater than the i-th deadzone Dzi, the i-th frequency data D_Frqi is normal frequency data which is outside the deadzone domain, and accordingly, the processing circuitry (e.g., the deadzone determination unit 120) may determine the i-th deadzone data D_Dzi as '1'.

In operation S270, the processing circuitry (e.g., the deadzone determination unit 120) may check whether the index i is equal to N, which is the total number of pieces of frequency data, and if i is not equal to N, the processing circuitry (e.g., the deadzone determination unit 120) may add 1 to the index i in operation S280 and then may repeat operations S230 to S260.

If, in operation S270, the index i is equal to N, which is the total number of pieces of frequency data, in operation S290, the processing circuitry (e.g., the deadzone determination unit 120) may output generated first to N-th pieces of deadzone data D_Dz1~N to the quantization unit 130.

Figure 8:
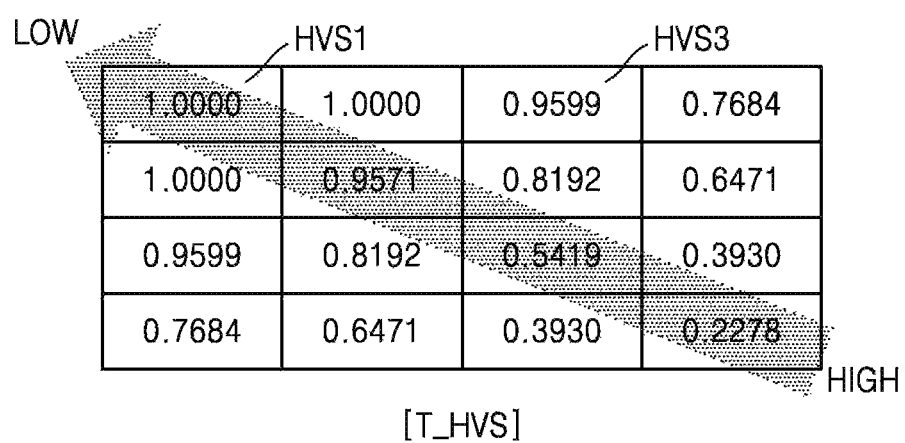
FIG. 8 is a diagram including a human visual system (HVS) table, according to an example embodiment of the present disclosure.

FIG. 8 is a diagram of the human visual system (HVS) table T_HVS according to an example embodiment of the present disclosure.

Referring to FIGS. 6 and 8, the HVS table T_HVS may include first to sixteenth visual frequency sensitivities HVS1~16. The HVS table T_HVS may include visual frequency sensitivities corresponding to the first to N-th pieces of frequency data D_Frq1~N. FIG. 8 illustrates an example in which the number of the first to N-th pieces of frequency data D_Frq1~N satisfies N=16, and accordingly, the HVS table T_HVS also includes the first to sixteenth visual frequency sensitivities HVS1~16 to satisfy N=16. The first to sixteenth visual frequency sensitivities HVS1~16 may respectively correspond to first to sixteenth pieces of frequency data D_Frq1~16. As an example, the first visual frequency sensitivity HVS1 may be a criterion for determining a deadzone regarding the first piece of frequency data D_Frq1, and the third visual frequency sensitivity HVS3 may be a criterion for determining a deadzone regarding the third piece of frequency data D_Frq3.

The HVS table T_HVS may include visual frequency sensitivities regarding frequency data having a low frequency, in an upper left direction of the diagonal line, and may include visual frequency sensitivities regarding frequency data having a high frequency, in a bottom right direction of the diagonal line. In an example embodiment of the present disclosure, with a higher frequency, the lower the value of a visual frequency sensitivity may be. In other words, the higher the frequency, the wider the deadzone.

Although an example in which N=16 may be illustrated in FIG. 8 and throughout the present specification, this is just an example, and the technical spirit of the present disclosure may be applied with respect to an integer N equal to or greater than 0.

Figure 9:
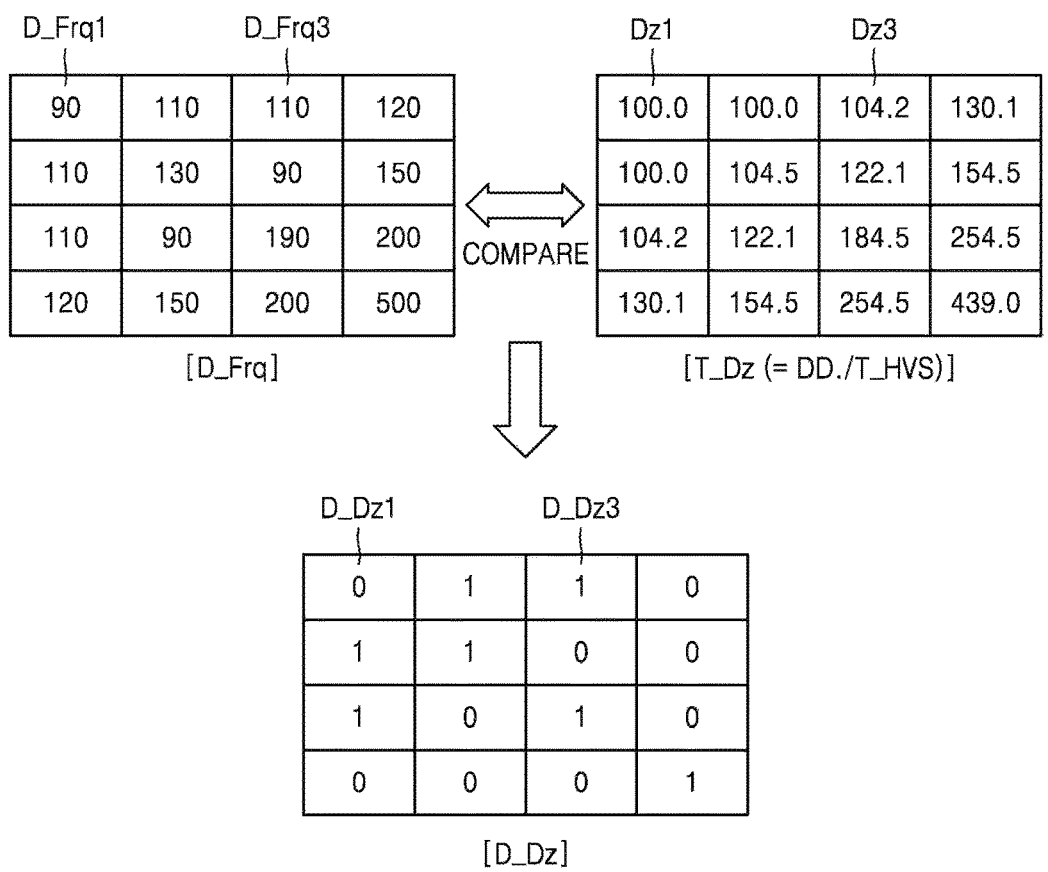
FIG. 9 is a diagram of a deadzone data determining process of a deadzone determination unit, according to an example embodiment of the present disclosure.

FIG. 9 is a diagram of a deadzone data determining process of the deadzone determination unit 120, according to an example embodiment of the present disclosure. A redundant description relating to FIG. 8 will be omitted herein.

Referring to FIGS. 3, 8, and 9, the processing circuitry (e.g., the deadzone determination unit 120) may generate a deadzone table T_Dz by using the HVS table T_HVS. First to sixteenth deadzones Dz1~16 included in the deadzone table T_Dz may be determined as values obtained by dividing the default deadzone DD by the first to sixteenth visual frequency sensitivities HVS1~16 included in the HVS table T_HVS. The determined first to sixteenth deadzones Dz1~16 may respectively correspond to the first to sixteenth pieces of frequency data D_Frq1~16 and thus may serve as deadzones. As an example, the first deadzone Dz1 may serve as a deadzone regarding the first piece of frequency data D_Frq1, and the third deadzone Dz3 may serve as a deadzone regarding the third piece of frequency data D_Frq3. FIG. 9 illustrates an example in which the default deadzone DD is '100'. Accordingly, the first to sixteenth deadzones Dz1~16 in the deadzone table T_Dz may be respectively determined as values obtained by dividing '100', which is the default deadzone DD, by the first to sixteenth visual frequency sensitivities HVS1~16 of FIG. 8. As an example, the first deadzone Dz1 may be determined as '100' by dividing the default deadzone DD by the first visual frequency sensitivity HVS1 (100=100/1), and the third deadzone Dz3 may be determined as '104.2' by dividing the default deadzone DD by the third visual frequency sensitivity HVS3 (104.2=100/0.9599).

The processing circuitry (e.g., the deadzone determination unit 120) may generate deadzone data D_Dz by comparing the first to sixteenth pieces of frequency data D_Frq1~16 with the first to sixteenth deadzones Dz1~16. When the frequency data D_Frq is included in a deadzone Dz, the deadzone determination unit 120 may determine the deadzone data D_Dz as '0', and when the frequency data D_Frq is not included in the deadzone Dz, the deadzone determination unit 120 may determine the deadzone data D_Dz as '1'. As an example, the deadzone determination unit 120 may compare the first piece of frequency data D_Frq1 with the first deadzone Dz1. Since the first piece of frequency data D_Frq1 is '90', and the first deadzone Dz1 is '100.0', the deadzone determination unit 120 may determine that the first piece of frequency data D_Frq1 is included in the first deadzone Dz1 (90<100), and may determine first deadzone data D_Dz1 as '0'. Also, since the third piece of frequency data D_Frq3 is '110', and the third deadzone Dz3 is '104.2', the deadzone determination unit 120 may determine that the third piece of frequency data D_Frq3 is not included in the third deadzone Dz3 (110>104.2), and may determine third deadzone data D_Dz3 as '1'. Through the above process, the deadzone determination unit 120 may determine first to sixteenth pieces of deadzone data D_Dz1~16, and may output the deadzone data D_Dz including the first to sixteenth pieces of deadzone data D_Dz1~16 to the quantization unit 130.

In an example embodiment of the present disclosure, the deadzone determination unit 120 may store the deadzone table T_Dz instead of the HVS table T_HVS. In other words, the deadzone table T_Dz generated by using the HVS table T_HVS and the default deadzone DD may be stored in the deadzone determination unit 120, and the deadzone determination unit 120 may determine a deadzone regarding frequency data without a process of generating the deadzone table T_Dz.

Figure 10:
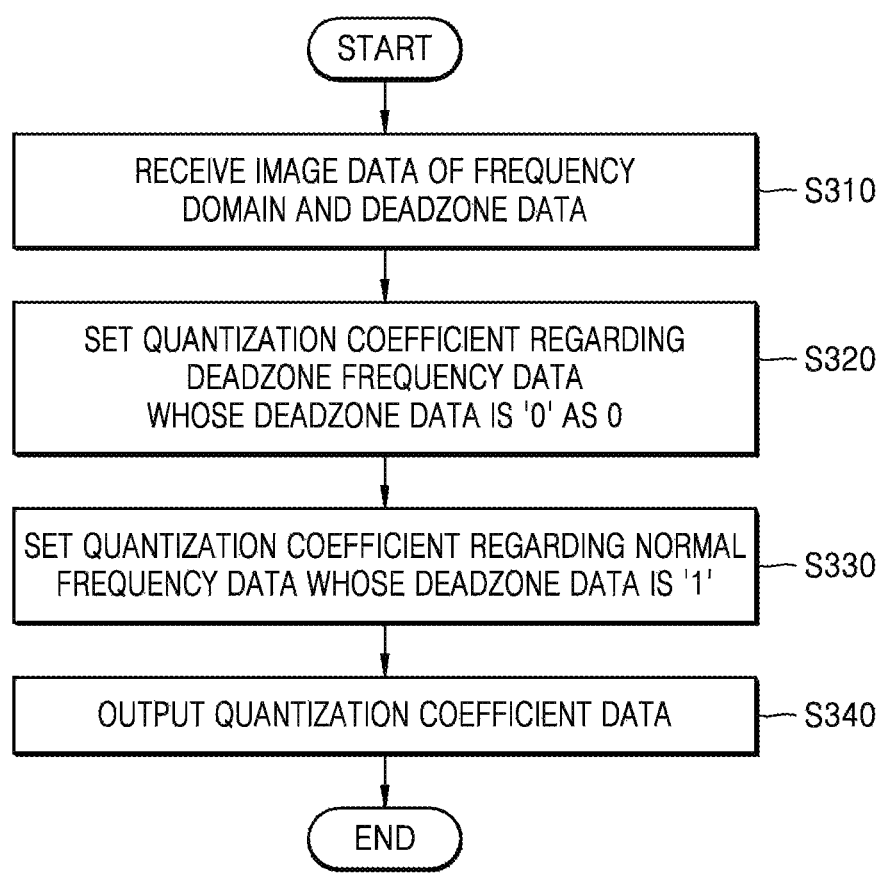
FIG. 10 is a flowchart of an operation of a quantization unit, according to an example embodiment of the present disclosure.

FIG. 10 is a flowchart of an operation of the quantization unit 130, according to an example embodiment of the present disclosure.

Referring to FIGS. 3 and 10, in operation S310, the processing circuitry (e.g., the quantization unit 130) may receive the image data D_Frq of the frequency domain including first to N-th pieces of frequency data D_Frq1~N from the domain transform unit 110, and may receive first to N-th pieces of deadzone data D_Dz1~N from the deadzone determination unit 120. The quantization unit 130 may determine deadzone frequency data from among the first to N-th pieces of frequency data D_Frq1~N, based on the first to N-th pieces of deadzone data D_Dz1~N.

In operation S320, the processing circuitry (e.g., the quantization unit 130) may determine frequency data D_Frq whose deadzone data D_Dz is '0' as deadzone frequency data, and may set a corresponding quantization coefficient as '0'.

Also, in operation S330, the processing circuitry (e.g., the quantization unit 130) may determine frequency data D_Frq whose deadzone data D_Dz is '1' as normal frequency data, and may set a corresponding quantization coefficient based on the frequency data D_Frq, a step size S, and a rounding offset.

In operation S340, when quantization coefficients regarding all of the first to N-th pieces of frequency data D_Frq1~N are set, the processing circuitry (e.g., the quantization unit 130) may output quantization coefficient data D_Qtz including the above quantization coefficients to an entropy encoding unit (220 of FIG. 1), etc.

Figure 11:
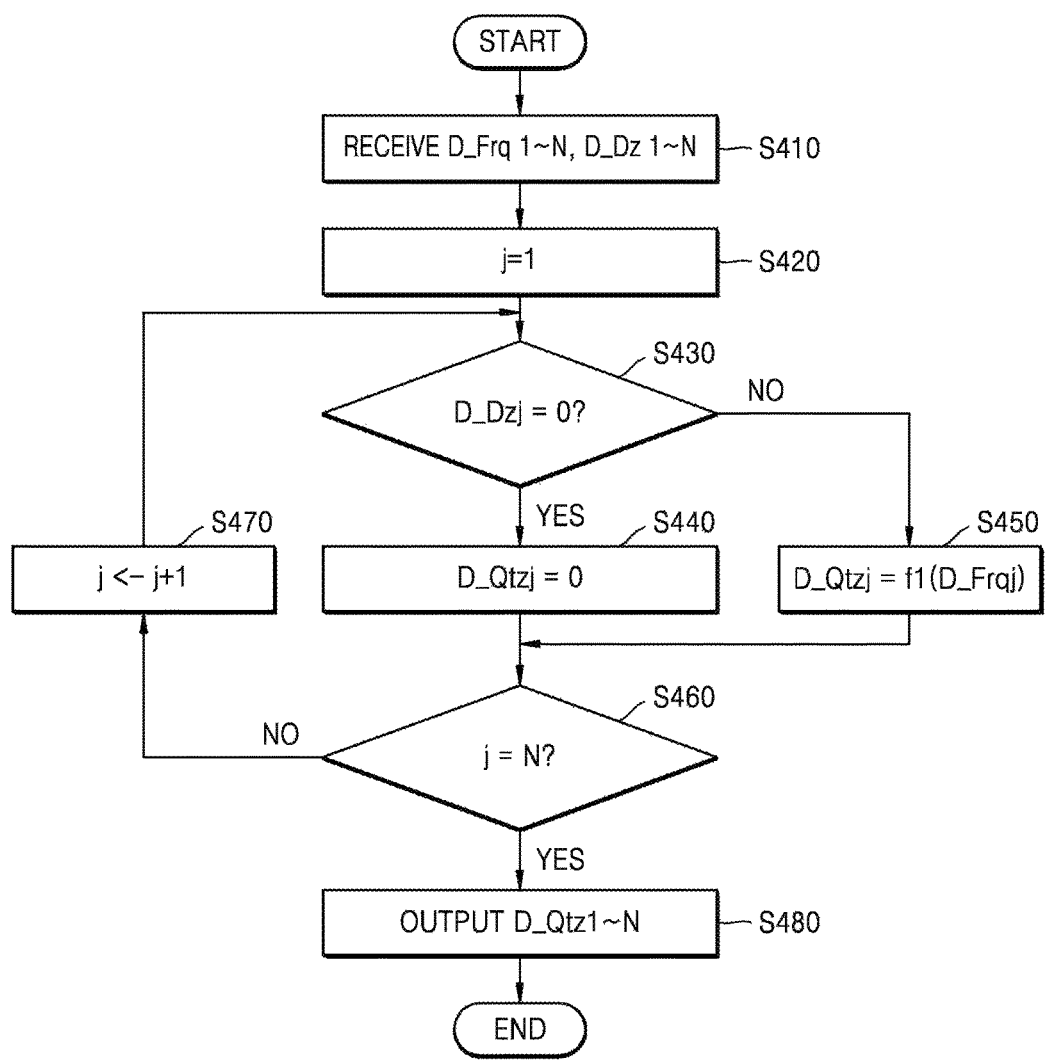
FIG. 11 is a flowchart of an operation algorithm of a quantization unit, according to an example embodiment of the present disclosure.

FIG. 11 is a flowchart of an operation algorithm of the quantization unit 130, according to an example embodiment of the present disclosure.

Referring to FIGS. 3, 10, and 11, in operation S410, the processing circuitry (e.g., the quantization unit 130) may receive the first to N-th pieces of frequency data D_Frq1~N from the domain transform unit 110, and may receive the first to N-th pieces of deadzone data D_Dz1~N from the deadzone determination unit 120.

The processing circuitry (e.g., the quantization unit 130) may set an index j as '1' in operation S420, and may check whether a j-th deadzone Dzj is '0' in operation S430.

In operation S440, when the j-th deadzone Dzj is '0', the processing circuitry (e.g., the quantization unit 130) may set a j-th quantization coefficient D_Qtzj as '0'.

In operation S450, when the j-th deadzone Dzj is not '0', the processing circuitry (e.g., the quantization unit 130) may set a value obtained by entering j-th frequency data D_Frqj into a first formula f1 as the j-th quantization coefficient D_Qtzj. In an example embodiment of the present disclosure, the first formula f1 may be a function of the j-th frequency data D_Frqj, the step size S, and a rounding offset 1−z. For example, the first formula f1 may be "sign(D_Frqj) *floor(D_Frqj/s+1−z)". The sign function may be a function for checking a sign of D_Frqj, and the floor function may be a Gaussian function. The rounding offset may be an adjustment value for rounding calculation according to the floor function. According to an example embodiment of the present disclosure, the rounding offset 1-z may have different values for respective pieces of frequency data D_Frq and may be a real number between 0~0.5.

In operation S460, after setting the j-th quantization coefficient D_Qtzj, the processing circuitry (e.g., the quantization unit 130) may check whether the index j is equal to a number N of pieces of frequency data D_Frq.

If the index j is not equal to the number N of pieces of frequency data D_Frq, the processing circuitry (e.g., the quantization unit 130) may add '1' to the index j in operation S470 and repeat operations S430 to S460.

If the index j is equal to the number N of pieces of frequency data D_Frq, in operation S480, the processing circuitry (e.g., the quantization unit 130) may output the quantization coefficient data D_Qtz including first to N-th quantization coefficients D_Qtz1~N to an entropy encoding unit (220 of FIG. 1), etc.

Figure 12:
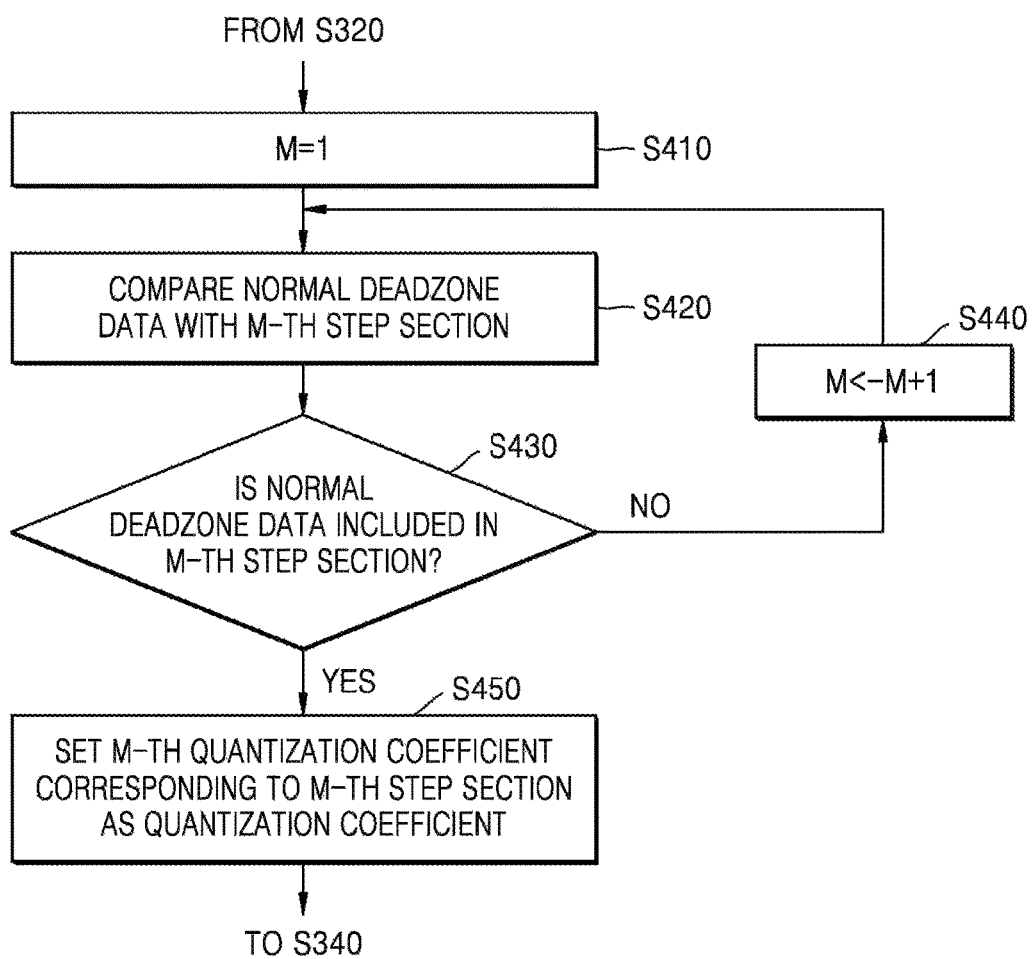
FIG. 12 is a flowchart of an operation of a quantization unit, according to an example embodiment of the present disclosure.

FIG. 12 is a flowchart of an operation of the quantization unit 130, according to an example embodiment of the present disclosure. In detail, FIG. 12 is a flowchart of another method of setting a quantization coefficient regarding normal frequency data. In other words, FIG. 12 is a flowchart of another method regarding operation S330 of FIG. 10.

Referring to FIGS. 3, 10, and 12, the processing circuitry (e.g., the quantization unit 130) may set an index M as '1' in operation S410, and may compare normal frequency data with an M-th step unit in operation S420.

As a result of the comparison, if the normal frequency data is not included in the M-th step unit in operation S430, the processing circuitry (e.g., the quantization unit 130) may add 1 to the index M in operation S440 and may compare the normal frequency data with the M-th step unit again in operation S420. As a result of the comparison, if the normal frequency data is included in the M-th step unit in operation S430, the processing circuitry (e.g., the quantization unit 130 the processing circuitry (e.g., may set an M-th quantization coefficient corresponding to the M-th step unit as a quantization coefficient regarding the normal frequency data in operation S450. For this, in an example embodiment of the present disclosure, the processing circuitry (e.g., the quantization unit 130) may include a mapping table of quantization coefficients and step units.

FIG. 13 is a diagram of a deadzone frequency data processing method of the quantization unit 130, according to an example embodiment of the present disclosure.

Referring to FIGS. 3 and 13, the quantization unit 130 may receive the image data D_Frq of the frequency domain including first to sixteenth pieces of frequency data D_Frq1~16 from the domain transform unit 110, and may receive first to sixteenth pieces of deadzone data D_Dz1~16 from the deadzone determination unit 120. The quantization unit 130 may classify the first to sixteenth pieces of frequency data D_Frq1~16 into deadzone frequency data and normal frequency data, based on the first to sixteenth pieces of deadzone data D_Dz1~16. The quantization unit 130 may set classification frequency data D_Frq' as '0' only with respect to the deadzone frequency data. As an example, since the first piece of deadzone data D_Dz1 is '0', the quantization unit 130 may determine the first piece of frequency data D_Frq1 as deadzone frequency data, and may a first piece of classification frequency data D_Frq'1 as '0'. Also, since the third piece of deadzone data D_Dz3 is '1', the quantization unit 130 may determine the third piece of frequency data D_Frq3 as normal frequency data, and may maintain the third piece of frequency data D_Frq3 as-is as a third piece of classification frequency data D_Frq'3.

Figure 14:
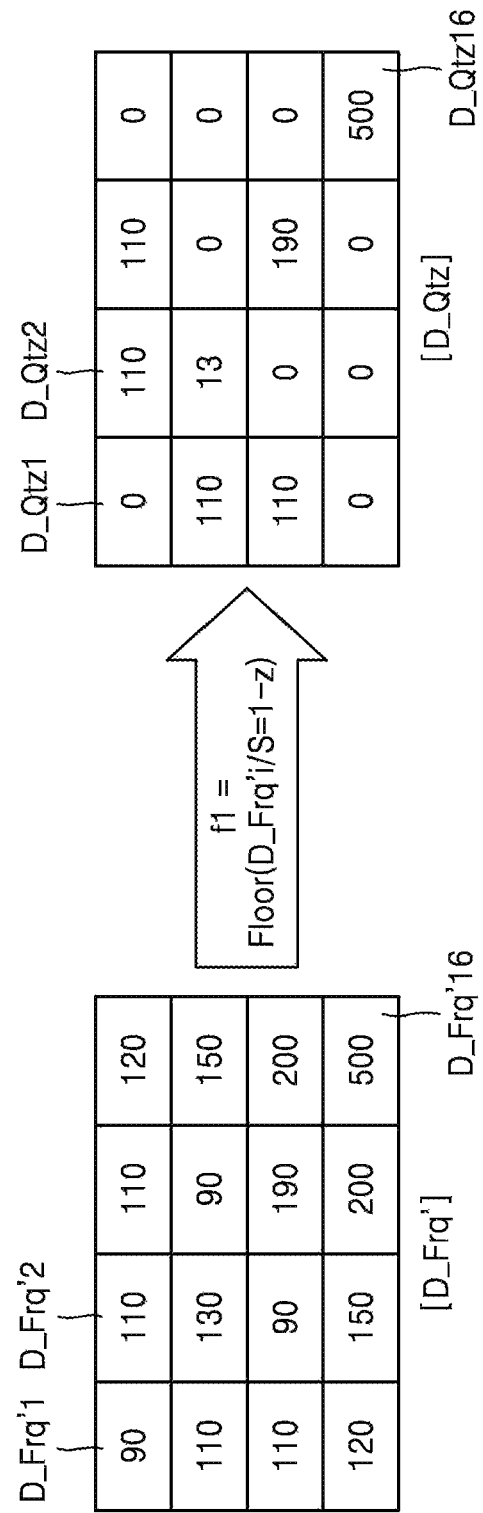
FIG. 14 is a diagram of a quantization coefficient setting method of a quantization unit, according to an example embodiment of the present disclosure.

FIG. 14 is a diagram of a quantization coefficient setting method of the quantization unit 130 according to an example embodiment of the present disclosure.

Referring to FIGS. 3, 11, and 14, the quantization unit 130 may set first to sixteenth quantization coefficients D_Qtz1~16, based on first to sixteenth pieces of classification frequency data D_Frq'1~16. The quantization unit 130 may set the first to sixteenth quantization coefficients D_Qtz1~16 by applying the first formula f1 to classification frequency data D_Frq'. Although FIG. 14 illustrates an example embodiment in which, with respect to an i-th classification frequency data D_Frq'i, the step size S, and the rounding offset 1−z, the first formula f1 is 'floor(D_Frq'i/S+1−z)', the step size S is '3', and the rounding offset 1−z is '0.5', the technical spirit of the present disclosure is not limited thereto. Although, as described above, the rounding offset 1−z may be different with respect to each frequency, FIG. 14 illustrates, for convenience of description, an example embodiment in which the rounding offset 1−z is '0.5' regardless of frequency.

As an example, the quantization unit 130 may set 'floor(0/3+1−0.5)=floor(0.5)=0' as the first quantization coefficient D_Qtz1 by applying the first formula f1 to a first piece of classification frequency data D_Frq'1. Also, the quantization unit 130 may set 'floor(110/3+1−0.5)=floor(37.167)=37' as the third quantization coefficient D_Qtz3 by applying the first formula f1 to a third piece of classification frequency data D_Frq'3, and may set 'floor(500/3+1−0.5)=floor(167.17)=167' as the sixteenth quantization coefficient D_Qtz16 with respect to a sixteenth piece of classification frequency data D_Frq'16.

Figure 15:
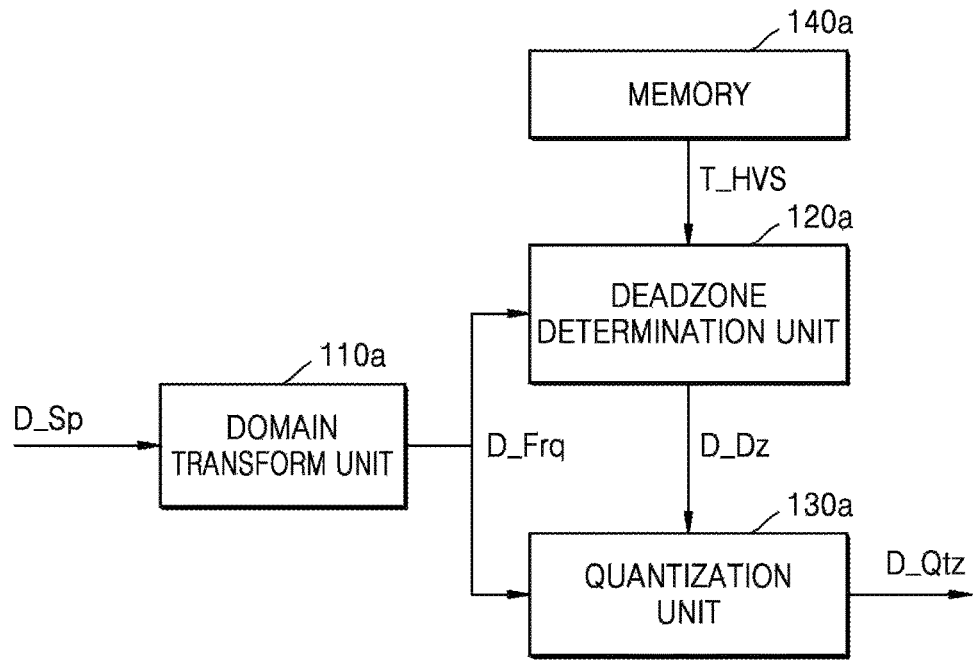
FIG. 15 is a block diagram of a transform and quantization module according to an example embodiment of the present disclosure.

FIG. 15 is a block diagram of a transform and quantization module 100a according to an example embodiment of the present disclosure. A redundant description relating to FIG. 3 will be omitted herein.

Referring to FIGS. 3 and 15, the processing circuitry, when performing the functions of the transform and quantization module 100a, may be configured to perform the functions of a domain transform unit 110a, a deadzone determination unit 120a, a quantization unit 130a. The transform and quantization module 100a may also further include a memory 140a. Since the domain transform unit 110a and the quantization unit 130a may respectively be substantially the same as or similar to the domain transform unit 110 and the quantization unit 130 of FIG. 3, descriptions thereof will be omitted herein.

The deadzone determination unit 120a may receive the HVS table T_HVS from the memory 140a, and may receive the image data D_Frq of the frequency domain from the domain transform unit 110a. The deadzone determination unit 120a may determine the deadzone data D_Dz regarding the image data D_Frq of the frequency domain by using the received HVS table T_HVS.

The memory 140a may store the HVS table T_HVS. The memory 140a may output the HVS table T_HVS to the deadzone determination unit 120a when the transform and quantization module 100a performs quantization. The memory 140a may be located inside or outside the encoder 10 of FIG. 1. Non-limiting examples of the memory 140a may include non-volatile memory such as NAND flash memory, vertical NAND (VNAND) flash memory, NOR flash memory, resistive random-access memory (RRAM), phase-change memory (PRAM), magnetoresistive random-access memory (MRAM), ferroelectric random-access memory (FRAM), and spin-transfer torque random-access memory (STT-RAM), or volatile memory such as static random-access memory (SRAM), dynamic random-access memory (DRAM), latch, flip-flop, and register.

Figure 16:
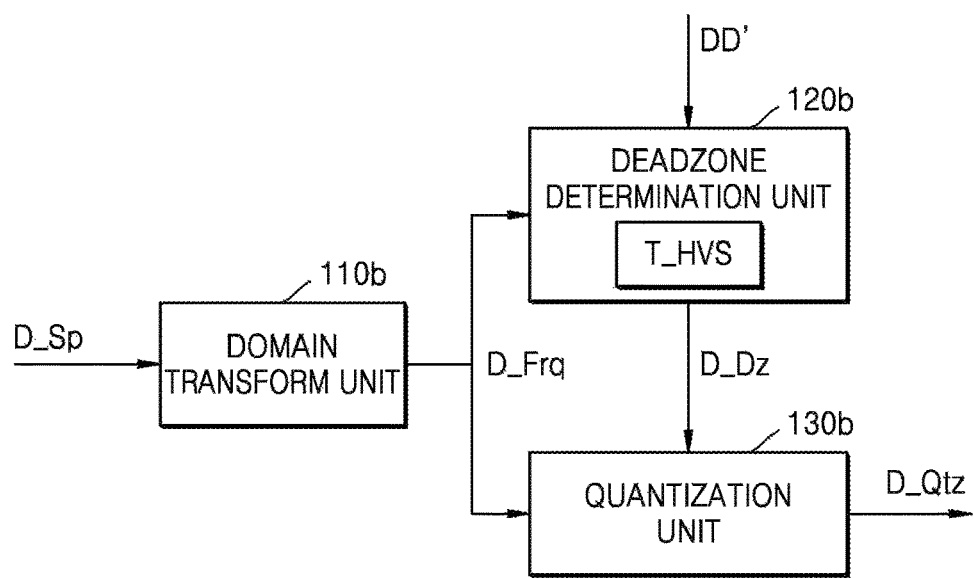
FIG. 16 is a block diagram of a transform and quantization module according to an example embodiment of the present disclosure.

FIG. 16 is a block diagram of a transform and quantization module 100b according to an example embodiment of the present disclosure. A redundant description relating to FIG. 3 will be omitted herein.

Referring to FIGS. 3 and 16, the processing circuitry, when performing the functions of the transform and quantization module 100b, may be configured to perform the functions of a domain transform unit 110b, a deadzone determination unit 120b, and a quantization unit 130b. Since the domain transform unit 110b and the quantization unit 130b may respectively be substantially the same as or similar to the domain transform unit 110 and the quantization unit 130 of FIG. 3, descriptions thereof will be omitted herein.

The deadzone determination unit 120b may receive a changed default deadzone DD' from the outside (for example, a host). The host or a controller may output the changed default deadzone DD' to the deadzone determination unit 120b in order to entirely change deadzones. Upon receiving the changed default deadzone DD', the deadzone determination unit 120b may use the changed default deadzone DD' to determine a deadzone Dz. In detail, the deadzone determination unit 120b may determine a value obtained by dividing the changed default deadzone DD' by each of the first to N-th visual frequency sensitivities HVS1~N included in the HVS table T_HVS as the deadzone Dz.

Figure 17:
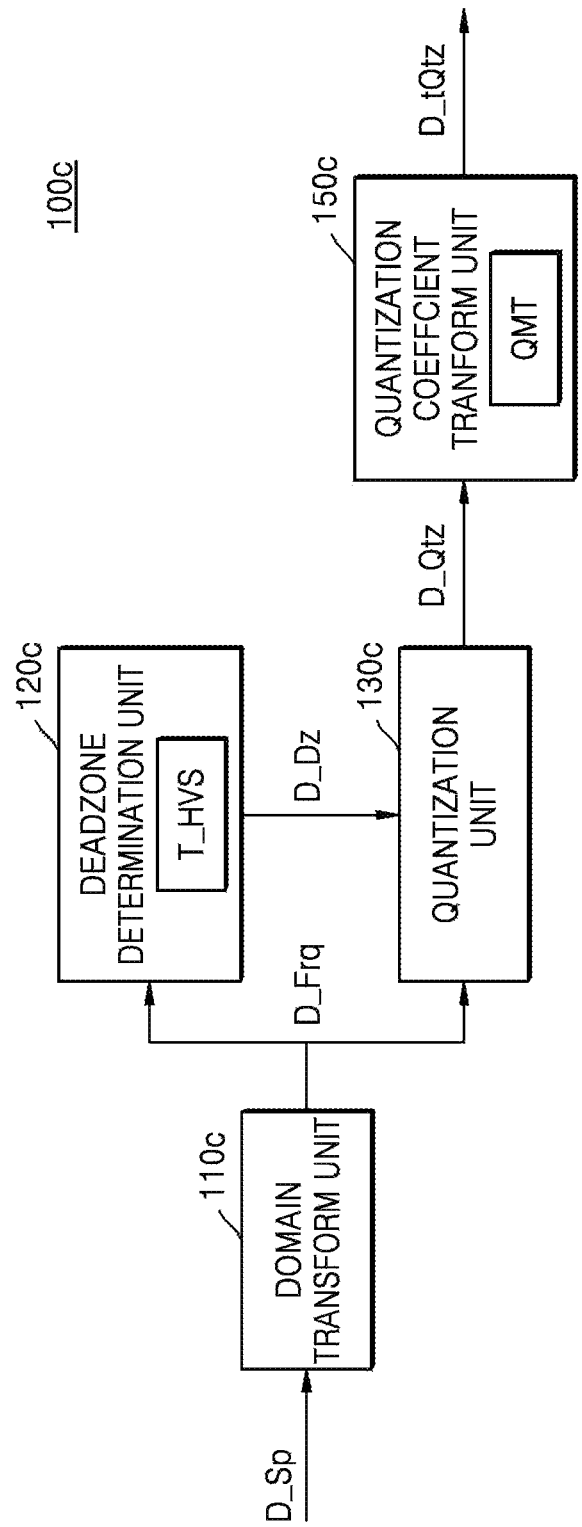
FIG. 17 is a block diagram of a transform and quantization module according to an example embodiment of the present disclosure.

FIG. 17 is a block diagram of a transform and quantization module 100c according to an example embodiment of the present disclosure. A redundant description relating to FIG. 3 will be omitted herein.

Referring to FIGS. 3 and 17, the processing circuitry, when performing the functions of the transform and quantization module 100c, may perform the functions of a domain transform unit 110c, a deadzone determination unit 120c, a quantization unit 130c, and a quantization coefficient transform unit 150c. Since the domain transform unit 110c, the deadzone determination unit 120c, and the quantization unit 130c may respectively be substantially the same as or similar to the domain transform unit 110, the deadzone determination unit 120, and the quantization unit 130 of FIG. 3, descriptions thereof will be omitted herein.

The quantization coefficient transform unit 150c may receive the quantization coefficient data D_Qtz from the quantization unit 130c and output transform quantization coefficient data D_tQtz. For this, the quantization coefficient transform unit 150c may include a quantization coefficient mapping table QMT. Quantization coefficients included in the quantization coefficient data D_Qtz may have a relatively large amount of data. The quantization coefficient transform unit 150c may generate the transform quantization coefficient data D_tQtz having a relatively small amount of data by performing mapping using the quantization coefficient mapping table QMT with respect to the quantization coefficients included in the quantization coefficient data D_Qtz. The quantization coefficient transform unit 150c may output the generated transform quantization coefficient data D_tQtz to a decoder. As will be described later, the decoder may inversely transform the transform quantization coefficient data D_tQtz into the quantization coefficient data D_Qtz by using an inverse transform quantization coefficient mapping table IQMT.

Figure 18:
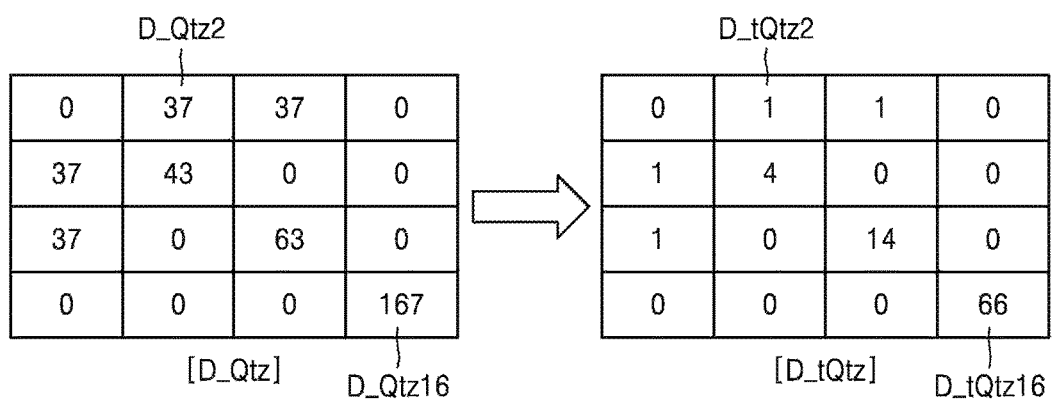
FIG. 18 is a diagram of an operation of a quantization coefficient transform unit, according to an example embodiment of the present disclosure.

FIG. 18 is a diagram of an operation of the quantization coefficient transform unit 150c, according to an example embodiment of the present disclosure.

Referring to FIGS. 17 and 18, the quantization coefficient transform unit 150c may receive the quantization coefficient data D_Qtz including first to sixteenth quantization coefficients D_Qtz1~16. The quantization coefficient transform unit 150c may transform the first to sixteenth quantization coefficients D_Qtz1~16 into first to sixteenth transform quantization coefficients D_tQtz1~16 by using the quantization coefficient mapping table QMT. As an example, the quantization coefficient transform unit 150c may transform '37', which is the second quantization coefficient D_Qtz2, into '1', which is the second transform quantization coefficient D_tQtz2, according to the quantization coefficient mapping table QMT. Also, the quantization coefficient transform unit 150c may transform '167', which is the sixteenth quantization coefficient D_Qtz16, into '66', which is the sixteenth transform quantization coefficient D_tQtz16, according to the quantization coefficient mapping table QMT. The first to sixteenth transform quantization coefficients D_tQtz1~16 may have a smaller amount of data relative to the first to sixteenth quantization coefficients D_Qtz1~16. Accordingly, during a process of transmitting and receiving data between an encoder including the quantization coefficient transform unit 150c and the decoder, transmission and reception rates may be higher.

Figure 19:
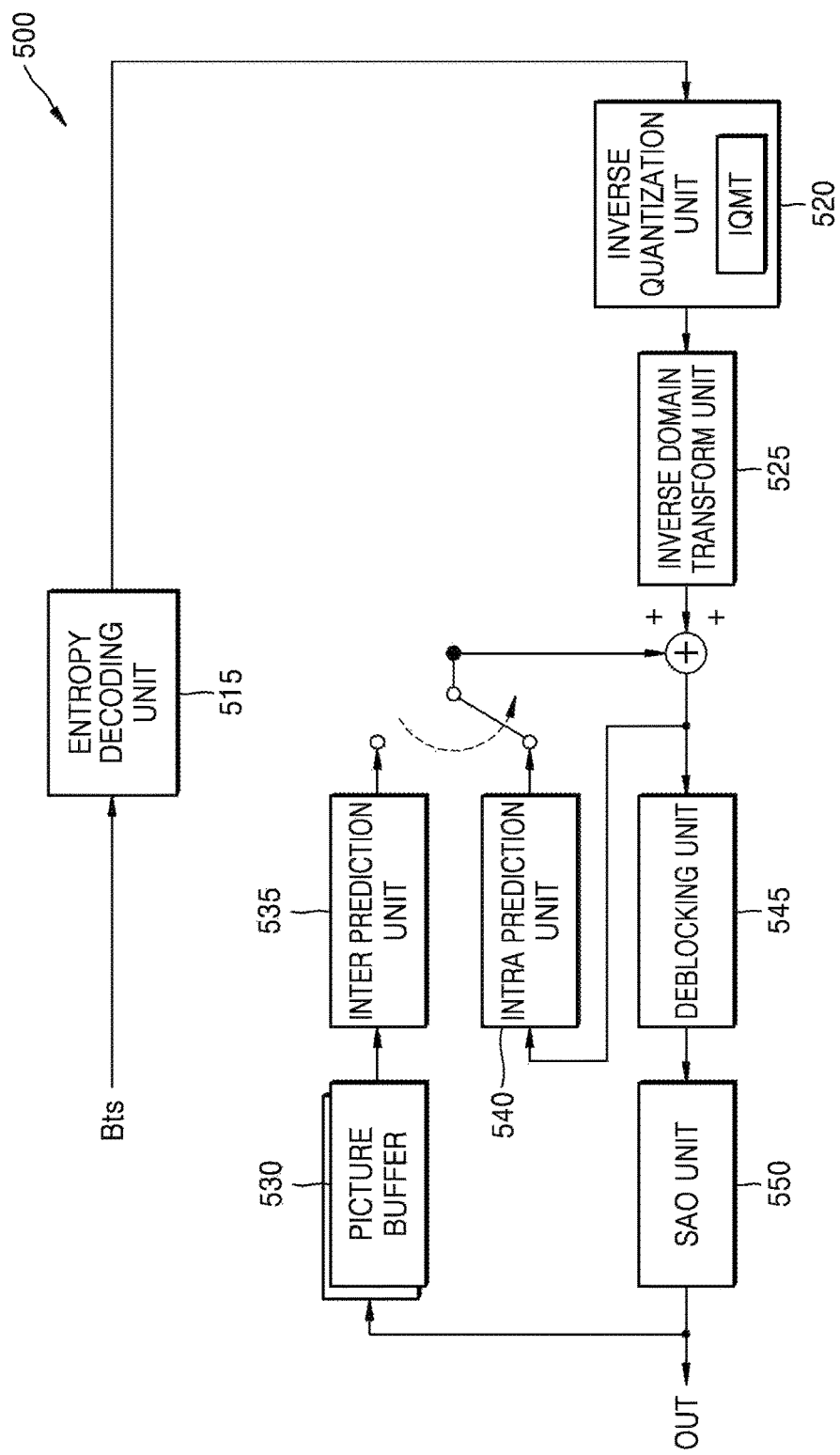
FIG. 19 is a block diagram of a decoder according to an example embodiment of the present disclosure.

FIG. 19 is a block diagram of a decoder 500 according to an example embodiment of the present disclosure.

Referring to FIG. 19, the decoder 500 may include a memory and processing circuitry.

The memory may include may include a non-transitory computer readable medium. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer-readable media may also be a distributed network, so that the program instructions are stored and executed in a distributed fashion.

The processing circuitry may include a processor, Central Processing Unit (CPU), a controller, an arithmetic logic unit (ALU), a digital signal processor, a microcomputer, a field programmable gate array (FPGA), an Application Specific Integrated Circuit (ASIC), a System-on-Chip (SoC), a programmable logic unit, a microprocessor, or any other device capable of performing operations in a defined manner.

The processing circuitry may be configured, through a layout design and/or execution of computer readable instructions stored in the memory, as a special purpose computer to perform the functions of the decoder 500 and the sub-components thereof.

For example, the decoder 500 may include an entropy decoding unit 515, an inverse quantization unit 520, an inverse domain transform unit 525, a picture buffer 530, an inter prediction unit 535, an intra prediction unit 540, a deblocking unit 545, and an SAO unit 550.

From a bitstream Bts, the entropy decoding unit 515 parses encoded image data to be decoded and encoding information necessary for decoding. The encoded image data is a transform quantization coefficient, and the inverse quantization unit 520 and the inverse domain transform unit 525 restore residual data from a quantized transform coefficient. According to an example embodiment of the present disclosure, the inverse quantization unit 520 may include an inverse transform quantization coefficient mapping table IQMT. The inverse quantization unit 520 may transform the transform quantization coefficient data D_tQtz into quantization coefficient data D_Qtz by using the inverse transform quantization coefficient mapping table IQMT. The inverse transform quantization coefficient mapping table IQMT may be a table corresponding to a quantization coefficient mapping table QMT.

The intra prediction unit 540 performs intra prediction for each prediction unit with respect to an encoding unit of an intra mode. The inter prediction unit 535 performs inter prediction for each prediction unit with respect to an encoding unit of an inter mode from among a current image by using a reference image obtained from the picture buffer 530. By adding prediction data regarding an encoding unit of each mode having passed through the intra prediction unit 540 or the inter prediction unit 535 to residual data, data of a spatial domain regarding an encoding unit of the current image may be restored, and the restored data of the spatial domain may be outputted as a restoration image OUT through the deblocking unit 545 and the SAO unit 550. Also, restoration images stored in the picture buffer 530 may be outputted as a reference image.

Figure 20:
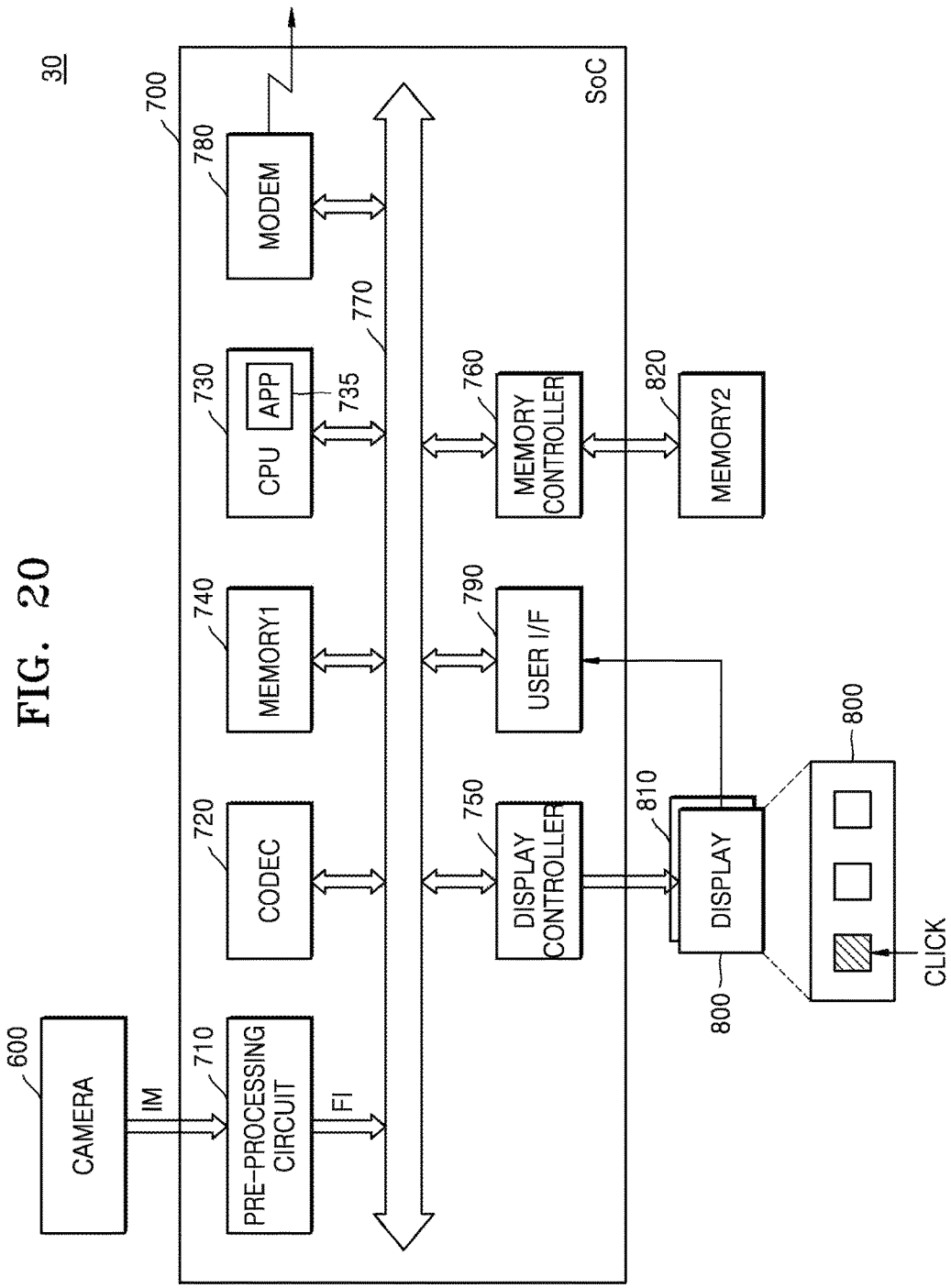
FIG. 20 is a block diagram of a video processing system according to an example embodiment of the present disclosure.

FIG. 20 is a block diagram of a video processing system 30 according to an example embodiment of the present disclosure.

Referring to FIG. 20, the video processing system 30 may include a camera 600, a system on chip (SoC) 700, a display 800, an input device 810, and a memory2 820. The video processing system 30 may refer to any apparatus capable of processing two-dimensional (2D) or three-dimensional (3D) graphics data and displaying the processed data.

The SoC 700 may control an overall operation of the video processing system 30. The SoC 700 may include a pre-processing circuit 710, a codec 720, a central processing unit (CPU) 730, a memory1 740, a display controller 750, a memory controller 760, a bus 770, a modem 780, and a user interface 790.

The pre-processing circuit 710 may receive first data IM outputted from the camera 600, process the received first data IM, and output second data FI, generated according to a processing result, to the codec 720. The codec 720 may perform an encoding or decoding operation regarding a plurality of frames or each block included in the second data FI. The encoding operation may involve image data encoding technology such as joint photographic experts group (JPEG), moving picture experts group (MPEG), MPEG-2, MPEG-4, VC-1, H.264, H.265, or high efficiency video coding (HEVC). However, example embodiments are not limited thereto. Although the codec 720 is implemented as a hardware codec in FIG. 1, a codec may be implemented as a hardware codec or software codec in accordance with the technical spirit of example embodiments of the inventive concepts. The software codec may be executed by the CPU 730. The codec 720 may include the encoder and the decoder described above with reference to FIGS. 1 to 19.

The CPU 730 may control an operation of the SoC 700. The memory1 740 may receive and store data encoded by the codec 720 as an application 735 is executed, according to control by the memory controller 760. The display controller 750 may transmit data outputted from the codec 720 or the CPU 730 to the display 800. The input device 810 may transmit an input signal to the user interface 790. The user interface 790 may receive the input signal from the input device 810 and may transmit data corresponding to the input signal to the CPU 730. The memory controller 760 may read data stored in the memory2 820 according to control by the codec 720 or the CPU 730 and may transmit the read data to the codec 720 or the CPU 730.

Example embodiments of the inventive concepts have been particularly shown and described with reference to some example embodiments thereof. Although some example embodiments have been described herein by using specific terms, the example embodiments and terms have merely been used to explain the technical spirit of the example embodiments of the present disclosure and should not be construed as limiting the meaning or the scope of the example embodiments of the present disclosure defined by the claims. It will be understood by one of ordinary skill in the art that various changes in form and details may be made therein without departing from the spirit and scope of the following claims.

What is claimed is:

1. An encoder comprising:
   a domain transform unit configured to transform first image data of a spatial domain into second image data of a frequency domain, the second image data including first to N-th pieces of frequency data, N being an integer equal to or greater than 1;
   a deadzone determination unit configured to determine a deadzone regarding each of the first to N-th pieces of frequency data based on a human visual system (HVS) table, the HVS table storing human visual frequency sensitivities, the deadzone determination unit configured to determine the deadzone by, for each of the human visual frequency sensitivities stored in the HVS table,
   dividing a default deadzone by a respective one of the human visual frequency sensitivities stored in the HVS table to generate deadzone frequency data, and
   generating deadzone data based on the frequency data and the deadzone frequency data such that the deadzone is independent of a step size associated with quantizing the second image data; and
   a quantization unit configured to perform, based on the deadzone and the step size, quantization regarding the second image data.

2. The encoder of claim 1, wherein the first image data is residual data indicating a difference between a current frame and a predicted frame.

3. The encoder of claim 1, wherein the deadzone determination unit is further configured to determine the deadzone as wide for pieces of frequency data that have low visual frequency sensitivities from among the first to N-th pieces of frequency data.

4. The encoder of claim 1, wherein the quantization unit is further configured to set a quantization coefficient as 0 with respect to the deadzone frequency data from among the first to N-th pieces of frequency data, the deadzone frequency data being within the deadzone.

5. The encoder of claim 1, wherein the quantization unit is further configured to,
   divide a continuous data level using the step size as a unit,
   determine a first step unit having the step size and including normal frequency data outside the deadzone from among the first to N-th pieces of frequency data, and
   perform quantization regarding the normal frequency data according to a first quantization coefficient corresponding the first step unit.

6. The encoder of claim 5, wherein the deadzone determination unit is further configured to determine the deadzone to be wider than the step size.

7. The encoder of claim 5, wherein the quantization unit is further configured to set, based on the step size and a rounding offset, a quantization coefficient regarding the normal frequency data.

8. The encoder of claim 5, further comprising:
   a quantization coefficient transform unit configured to transform the first quantization coefficient into a second quantization coefficient having a smaller amount of data.

9. The encoder of claim 1, further comprising:
   a memory configured to store the HVS table.

10. A video processing system comprising:
    a memory configured to store a human visual system (HVS) table including human visual frequency sensitivities; and an encoder including,
  a domain transform unit configured to transform first image data of a spatial domain into second image data of a frequency domain, the second image data including first to N-th pieces of frequency data, N being an integer equal to or greater than 1,
  a deadzone determination unit configured to determine, based on the HVS table, a deadzone regarding each of the first to N-th pieces of frequency data, the deadzone determination unit configured to determine the deadzone by, for each of the human visual frequency sensitivities stored in the HVS table,
    dividing a default deadzone by a respective one of the human visual frequency sensitivities stored in the HVS table to generate deadzone frequency data, and
    generating deadzone data based on the frequency data and the deadzone frequency data such that the deadzone is independent of a step size associated with quantizing the second image data, and
  a quantization unit configured to perform, based on the deadzone and the step size, quantization regarding the second image data.

11. The video processing system of claim 10, wherein the quantization unit is further configured to set a quantization coefficient as 0 with respect to the deadzone frequency data from among the first to N-th pieces of frequency data, the deadzone frequency data being within the deadzone.

12. The video processing system of claim 10, wherein the quantization unit is further configured to,
  divide a continuous data level using the step size as a unit;
  determine a first step unit having the step size and including normal frequency data outside the deadzone from among the first to N-th pieces of frequency data; and
  perform quantization regarding the normal frequency data according to a first quantization coefficient corresponding the first step unit.

13. The video processing system of claim 12, wherein the encoder further includes a quantization coefficient transform unit configured to transform the first quantization coefficient into a second quantization coefficient such that the second quantization coefficient has a smaller amount of data than the first quantization coefficient, and the video processing system further comprises:
  a decoder configured to,
    receive quantized image data from the encoder, and
    perform decoding thereon by restoring the second quantization coefficient to the first quantization coefficient.

14. An encoder comprising:
  processing circuitry configured to,
    determine a deadzone in each of a plurality of pieces of image data based on Human Visual System (HVS) information indicating human visual frequency sensitivities, the plurality of pieces of image data being in a frequency domain and including frequency data, the processing circuitry configured to determine the deadzone by, for each of the human visual frequency sensitivities in the HVS information,
      dividing a default deadzone by a respective one of the human visual frequency sensitivities to generate deadzone frequency data, and
      generating deadzone data based on the frequency data and the deadzone frequency data such that the deadzone is independent of a step size associated with quantizing the plurality of pieces of image data, and
    quantize the plurality of pieces of image data based on the deadzone and the step size.

15. The encoder of claim 14, wherein the plurality of pieces of image data are residual data indicating a difference between a current frame and a predicted frame.

16. The encoder of claim 14, wherein the deadzone indicates ones of the plurality of pieces of image data having an associated frequency that has a low visual frequency sensitivity to a viewer.

17. The encoder of claim 14, wherein the processing circuitry is configured to,
  set a quantization coefficient based on whether ones of the plurality of pieces of image data are in the deadzone, and
  quantize the plurality of pieces of image data based on the quantization coefficient and the step size.

* * * * *